(12) United States Patent
Yang

(10) Patent No.: US 12,273,797 B2
(45) Date of Patent: Apr. 8, 2025

(54) ANTI-COUNTERFEITING TWO-PIECE TYPE ELECTROMAGNETIC INDUCTION SEALING LINER

(71) Applicant: HI-JOINT TECHNOLOGIES CORPORATION, New Taipei (TW)

(72) Inventor: Yen-Wu Yang, New Taipei (TW)

(73) Assignee: HI-JOINT TECHNOLOGIES CORPORATION, New Taipei (TW)

( * ) Notice: Subject to any disclaimer, the term of this patent is extended or adjusted under 35 U.S.C. 154(b) by 302 days.

(21) Appl. No.: 17/990,760

(22) Filed: Nov. 21, 2022

(65) Prior Publication Data

US 2024/0171952 A1    May 23, 2024

(51) Int. Cl.
*G06Q 30/018* (2023.01)
*G06K 19/07* (2006.01)
*H04B 5/24* (2024.01)
*H04B 5/72* (2024.01)
*H04W 4/80* (2018.01)

(52) U.S. Cl.
CPC .......... *H04W 4/80* (2018.02); *G06K 19/0723* (2013.01); *G06Q 30/0185* (2013.01); *H04B 5/24* (2024.01); *H04B 5/72* (2024.01)

(58) Field of Classification Search
CPC .. G06K 19/0723; G06K 19/07; G06Q 30/018; G06Q 30/0185; H04B 5/72; H04B 5/24; H04B 5/00; H04B 5/0031; H04B 5/0075; H04W 4/80
See application file for complete search history.

(56) References Cited

U.S. PATENT DOCUMENTS

2009/0153334 A1* 6/2009 Burns .............. G06K 19/07798
                                                    340/572.8
2021/0002047 A1* 1/2021 Fujita ................... B65D 51/245

* cited by examiner

*Primary Examiner* — Tuan H Nguyen

(57) ABSTRACT

An anti-counterfeiting two-piece type electromagnetic induction sealing liner includes an adhesive layer, an electromagnetic induction heating layer, a weak adhesive layer, a backing layer and an information tag sequentially composited from bottom to top. The information tag is built-in with an information chip and an antenna circuit electrically connected to the information chip. The present disclosure is capable of enhancing an anti-counterfeiting ability of a product when used.

11 Claims, 2 Drawing Sheets

ANTI-COUNTERFEITING TWO-PIECE TYPE ELECTROMAGNETIC INDUCTION SEALING LINER

BACKGROUND OF THE INVENTION

1. Field of the Invention

The present disclosure relates to the field of packaging, and in particular to an anti-counterfeiting two-piece type electromagnetic induction sealing liner.

2. Description of the Related Art

In current techniques, in order to realize functions including anti-counterfeiting, production history records, storage and transportation logistics and tracking, some products are provided with information tags (common radio-frequency (RF) labels or two-dimensional barcode labels) for information read/write functions. Most products with information tags usually have the information tags directly attached on the outside of products and provide an insufficient ant-counterfeiting ability, such that the information tags can be easily replaced without impairing packaging of the products (for example, without opening a cap of a bottle). As a result, such products are susceptible to tampering for illegal uses, for example, replacing information tags to falsify the production date of the products, replacing information tags to masquerade as superior products by those of a lesser quality and the like. Moreover, information tags directly attached on the outside of products are also prone to falling off or damage.

BRIEF SUMMARY OF THE INVENTION

It is an object of the present disclosure to provide an anti-counterfeiting two-piece type electromagnetic sealing liner to overcome the defects of the prior art.

To achieve the above object, the solution of the present disclosure is:

An anti-counterfeiting two-piece type electromagnetic sealing liner includes an adhesive layer, an electromagnetic induction heating layer, a weak adhesive layer, a backing layer and an information tag sequentially composited from bottom to top. The information tag is built-in with an information chip and an antenna circuit electrically connected to the information chip.

The adhesive layer is made of one selected from a group consisting of polyethylene, polyethylene terephthalate, polypropylene and hot melt adhesive.

The electromagnetic induction heating layer is made of one selected from a group consisting of an aluminum foil layer, an aluminum-plastic composite layer and an aluminum-paper composite layer.

The weak adhesive layer is made of microcrystalline paraffin.

The backing layer is made of one selected from a group consisting of cardboard, paper-plastic composite board or paper-foam composite board.

The information tag includes a mask, a base film, and the information chip and the antenna circuit sandwiched between the mask and the base film.

The mask and the base film are made of one selected from a group consisting of polyethylene, polyethylene terephthalate and polypropylene.

The information chip is one selected from a group consisting of a radio-frequency identification (RFID) chip, a near-field communication (NFC) chip, a mobile equipment identification (EMID) chip and an ultra-wideband identification (UWBID) chip.

The adhesive layer is composited with the electromagnetic induction heating layer by a strong adhesive.

The backing layer is composited with the information tag by the strong adhesive.

With the above solution, during the use of the anti-counterfeiting two-piece type electromagnetic sealing liner of the present disclosure, production personnel first place anti-counterfeiting two-piece type electromagnetic sealing liner of the present disclosure at a mouth of a bottle, such that the adhesive layer of the anti-counterfeiting two-piece type electromagnetic sealing liner of the present disclosure comes into contact with the mouth, and then the production personnel fit a cap with a safety ring on the mouth of the bottle. Lastly, a production sound source generates an electromagnetic field by an electromagnetic induction sealing machine, and heats the electromagnetic induction heating layer by means of electromagnetic induction to heat and melt the adhesive layer that then becomes adhered to the mouth of the bottle, thereby sealing the mouth by the anti-counterfeiting two-piece type electromagnetic sealing liner of the present disclosure. Thus, without later opening the cap, production personnel are able to read/write product information on the information tag of the anti-counterfeiting two-piece type electromagnetic sealing liner of the present disclosure by a dedicated information reader/writer, and consumers and inspectors are able to read product information on the information tag of the anti-counterfeiting two-piece type electromagnetic sealing liner of the present disclosure by a universal information reader/writer, thereby implementing a product tracking and tracing function. Moreover, since the safety ring becomes damaged if the cap is opened and the information tag cannot be replaced without opening the cap, the information tag cannot be replaced by individuals with ill intentions without impairing the packaging of products, hence enhancing the anti-counterfeiting ability of products. In addition, the cap provides the information tag of the anti-counterfeiting two-piece type electromagnetic sealing liner of the present disclosure with positioning and protection effects, further effectively preventing the information tag from falling off or damage without opening the cap.

DETAILED DESCRIPTION OF THE INVENTION

To better explain the technical solution of the present disclosure, details of the present disclosure are given by way of specific embodiments below.

Figure 1:
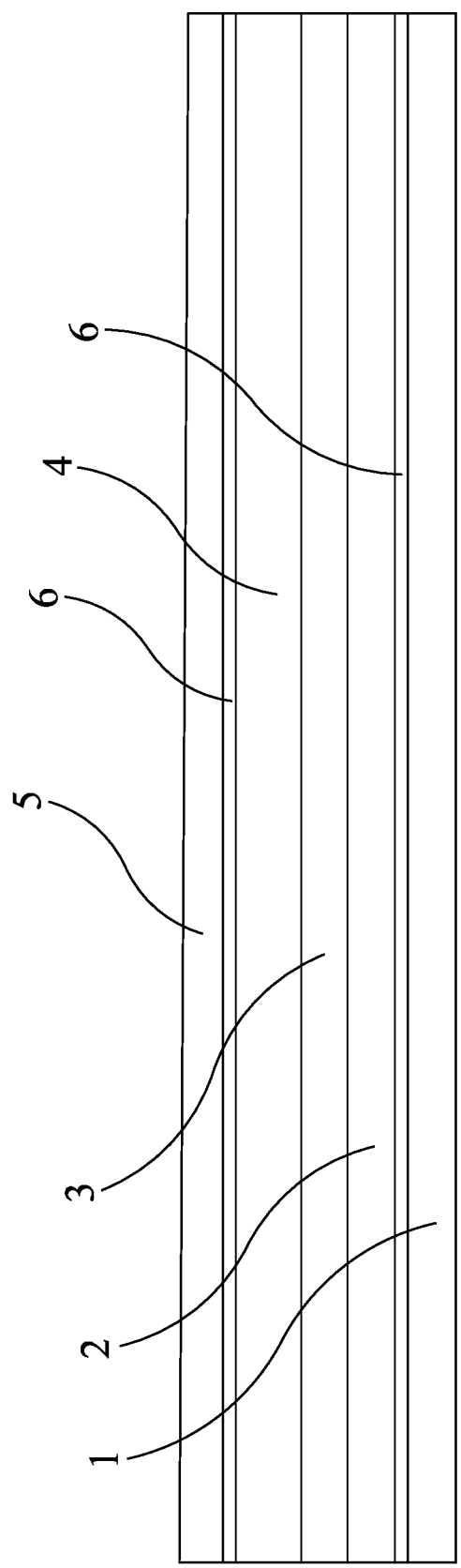
FIG. 1 is a side view of the present disclosure.
Figure 2:
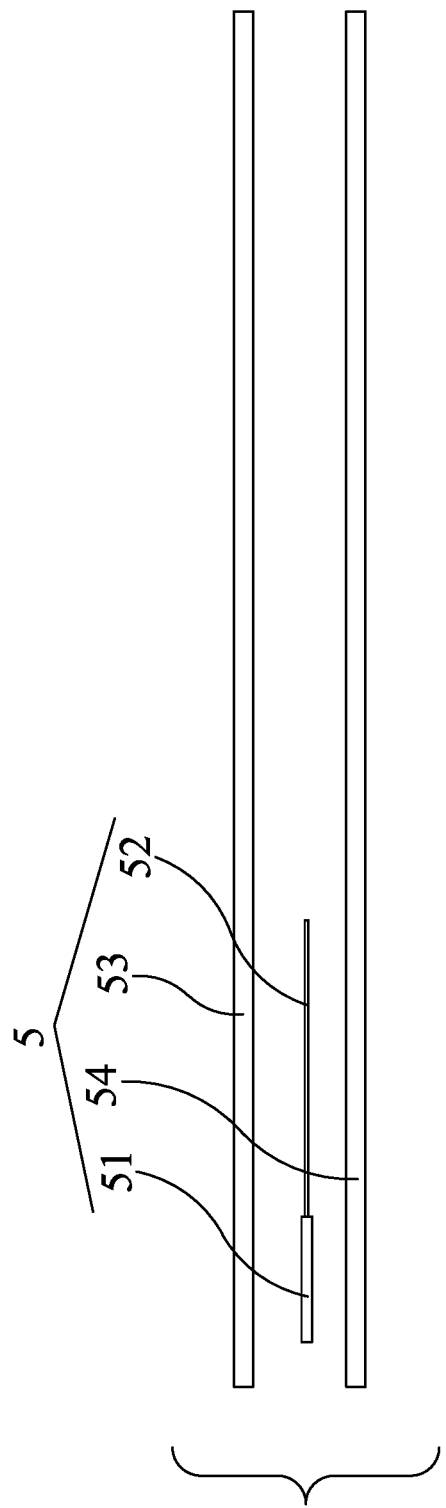
FIG. 2 is an exploded diagram of an information tag of the present disclosure.

As shown in FIG. 1 and FIG. 2, the present disclosure provides an anti-counterfeiting two-piece type electromagnetic sealing liner, which includes an adhesive layer 1, an electromagnetic induction heating layer 2, a weak adhesive layer 3, a backing layer 4 and an information tag 5 sequentially composited from bottom to top. The information tag 5 is built-in with an information chip 51 and an antenna circuit 52 electrically connected to the information chip 51, wherein the information tag 5 is for reading/writing various types of product information for subsequent product tracking and tracing.

During the use of the anti-counterfeiting two-piece type electromagnetic sealing liner of the present disclosure, production personnel first place the anti-counterfeiting two-piece type electromagnetic sealing liner of the present disclosure at a mouth of a bottle, such that the adhesive layer 1 of the anti-counterfeiting two-piece type electromagnetic sealing liner comes into contact with the mouth, and then the production personnel fit a cap with a safety ring on the mouth of the bottle. Lastly, a production sound source generates an electromagnetic field by an electromagnetic induction sealing machine, and heats the electromagnetic induction heating layer 2 by means of electromagnetic induction to heat and melt the adhesive layer 1 that then becomes adhered to the mouth of the bottle, thereby sealing the mouth by the anti-counterfeiting two-piece type electromagnetic sealing liner of the present disclosure. Thus, without later opening the cap, production personnel are able to read/write product information on the information tag 5 of the anti-counterfeiting two-piece type electromagnetic sealing liner of the present disclosure by a dedicated information reader/writer, and consumers and inspectors are able to read product information on the information tag 5 of the anti-counterfeiting two-piece type electromagnetic sealing liner of the present disclosure by a universal information reader/writer, thereby implementing a product tracking and tracing function. Moreover, since the safety ring becomes damaged if the cap is opened and the information tag 5 cannot be replaced without opening the cap, the information tag 5 cannot be replaced by individuals with ill intentions without impairing the packaging of products, hence enhancing the anti-counterfeiting ability of products. In addition, the cap provides the information tag 5 of the anti-counterfeiting two-piece type electromagnetic sealing liner of the present disclosure with positioning and protection effects, further effectively preventing the information tag 5 from falling off or damage without opening the cap.

In the present disclosure, the adhesive layer 1 is made of one selected from a group consisting of polyethylene, polyethylene terephthalate, polypropylene and hot melt adhesive. The adhesive layer 1 may also be made of other materials, given that the adhesive layer 1 becomes adhered to the mouth of the bottle after being heated. The adhesive layer 1 is composited with the electromagnetic induction heating layer 2 by a strong adhesive 6 having strong adhesion ability, ensuring stable composition between the adhesive layer 1 and the electromagnetic induction heating layer 2, wherein the strong adhesive 6 may be polyurethane glue or hot melt glue.

In the present disclosure, the electromagnetic induction heating layer 2 is made of one selected from a group consisting of an aluminum foil layer, an aluminum-plastic composite layer and an aluminum-paper composite layer. The electromagnetic induction heating layer 2 is heated under the effect of an electromagnetic field. The aluminum-plastic composite layer is an aluminum-plastic film, and the aluminum-paper composite layer is composited by aluminum foil and paper.

In the present disclosure, the composition of the weak adhesive layer 3 includes microcrystalline paraffin. The weak adhesive layer 3 has a weak adhesion ability. When the electromagnetic induction heating layer 2 is not yet heated, the weak adhesive layer 3 combines the electromagnetic induction heating layer 2 and the backing layer 4. When the electromagnetic induction heating layer 2 is heated, the weak adhesive layer 3 melts and is absorbed by the backing layer 4, such that the electromagnetic induction heating layer 2 is separated from the backing layer 4 and the information tag 5, hence facilitating opening the mouth of the bottle. After opening the mouth of the bottle, the backing layer 4 and the information tag 5 can be used as an independent liner to ensure the sealability of the cap when the mouth is again closed.

In the present disclosure, the backing layer 4 is made of one selected from a group consisting of cardboard, paper-plastic composite board or paper-foam composite board. The backing layer 4 is capable of absorbing the weak adhesive layer 3 having been melted. Moreover, the backing layer 4 is capable of compositing with the information tag 5 by the strong adhesive layer 6 having a strong adhesion ability, providing stable composition between the backing layer 4 and the information tag 5. The paper-plastic composite board is composited from cardboard and plastic board, and the paper-foam composite board is compo sited from cardboard and foam board.

In the present disclosure, the information tag 5 includes a mask 53, a base film 54, and the information chip 51 and the antenna circuit 52 sandwiched between the mask 53 and the base film 54. The information chip 51 may be one selected from a group consisting of a radio-frequency identification (RFID) chip, a near-field communication (NFC) chip, a mobile equipment identification (EMID) chip and an ultra-wideband identification (UWBID) chip, which are capable of realizing information read/write functions by the antenna circuit 52. The mask 53 and the base film 54 are made of one selected from a group consisting of polyethylene, polyethylene terephthalate and polypropylene.

The embodiments and drawings given above are not to be construed as limitations to the product forms and patterns of the present disclosure, and all appropriate changes and modifications made by a person skilled in the art are to be encompassed within the scope of the present disclosure.

What is claimed is:

1. An anti-counterfeiting two-piece type electromagnetic induction sealing liner, comprising an adhesive layer, an electromagnetic induction heating layer, a weak adhesive layer, a backing layer and an information tag sequentially composited from bottom to top;
   wherein, the information tag is built-in with an information chip and an antenna circuit electrically connected to the information chip; when the electromagnetic induction heating layer is heated, the weak adhesive layer is melted and absorbed by the backing layer, such that the electromagnetic induction heating layer is separated from the backing layer and the information tag.

2. The anti-counterfeiting two-piece type electromagnetic induction sealing liner according to claim 1, wherein the adhesive layer is made of one selected from a group consisting of polyethylene, polyethylene terephthalate, polypropylene and hot melt adhesive.

3. The anti-counterfeiting two-piece type electromagnetic induction sealing liner according to claim 1, wherein the electromagnetic induction heating layer is made of one selected from a group consisting of an aluminum foil layer, an aluminum-plastic composite layer and an aluminum-paper composite layer.

4. The anti-counterfeiting two-piece type electromagnetic induction sealing liner according to claim 1, wherein the weak adhesive layer is made of microcrystalline paraffin.

5. The anti-counterfeiting two-piece type electromagnetic induction sealing liner according to claim 1, wherein the backing layer is made of one selected from a group consisting of cardboard, paper-plastic composite board or paper-foam composite board.

6. The anti-counterfeiting two-piece type electromagnetic induction sealing liner according to claim 1, wherein the information tag comprises a mask, a base film, and the information chip and the antenna circuit sandwiched between the mask and the base film.

7. The anti-counterfeiting two-piece type electromagnetic induction sealing liner according to claim 6, wherein the mask and the base film are made of one selected from a group consisting of polyethylene, polyethylene terephthalate and polypropylene.

8. The anti-counterfeiting two-piece type electromagnetic induction sealing liner according to claim 1, wherein the information chip is one selected from a group consisting of a radio-frequency identification (RFID) chip, a near-field communication (NFC) chip, a mobile equipment identification (EMID) chip and an ultra wideband identification (UWBID) chip.

9. The anti-counterfeiting two-piece type electromagnetic induction sealing liner according to claim 6, wherein the information chip is one selected from a group consisting of a radio-frequency identification (RFID) chip, a near-field communication (NFC) chip, a mobile equipment identification (EMID) chip and an ultra wideband identification (UWBID) chip.

10. The anti-counterfeiting two-piece type electromagnetic induction sealing liner according to claim 1, wherein the adhesive layer is composited with the electromagnetic induction heating layer by a strong adhesive.

11. The anti-counterfeiting two-piece type electromagnetic induction sealing liner according to claim 10, wherein the backing layer is composited with the information tag by the strong adhesive.

* * * * *